(No Model.)
H. C. BEHRENS.
FISHING LINE FLOAT.
No. 322,088. Patented July 14, 1885.
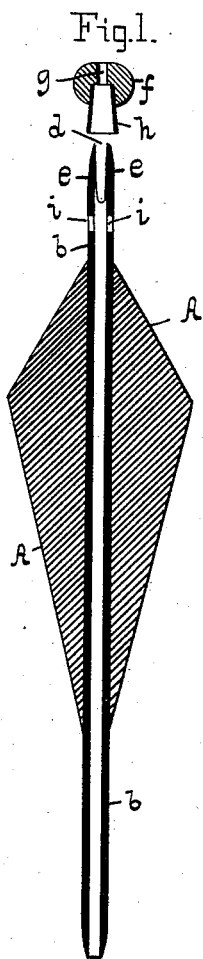
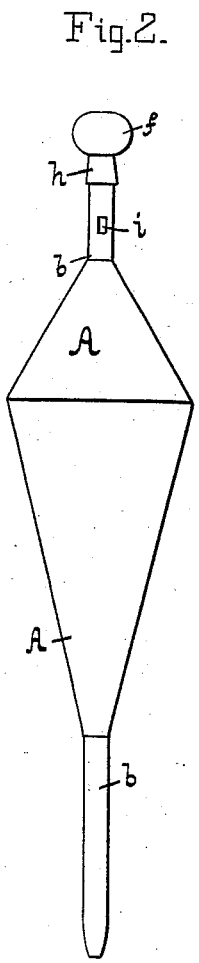
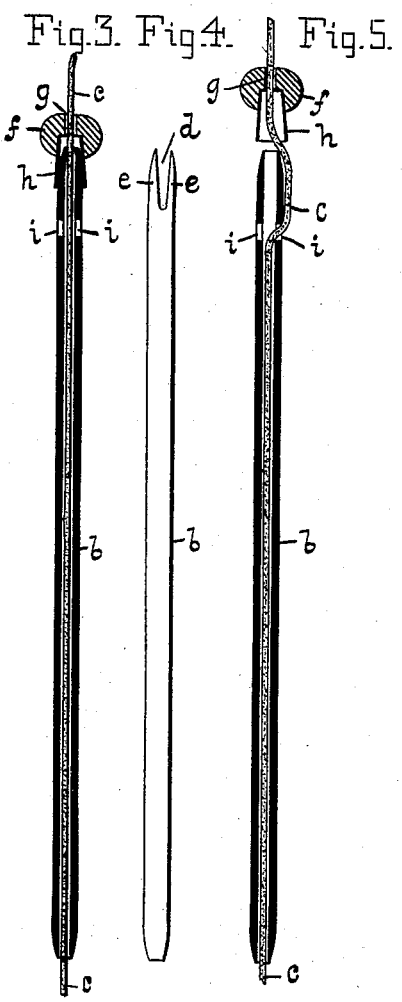
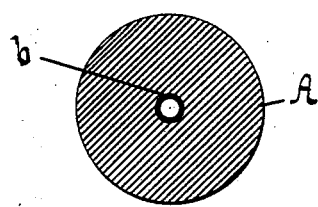
WITNESSES:
Bew. H. Boyden.
Hilson Ringle,
INVENTOR:
Henry C. Behrens
By G. H. Boyden
Attorney.

UNITED STATES PATENT OFFICE.

HENRY C. BEHRENS, OF BALTIMORE, MARYLAND.

FISHING-LINE FLOAT.

SPECIFICATION forming part of Letters Patent No. 322,088, dated July 14, 1885.

Application filed February 26, 1885. (No model.)

*To all whom it may concern:*

Be it known that I, HENRY C. BEHRENS, a citizen of the United States, residing at Baltimore, in the State of Maryland, have invented certain new and useful Improvements in Fishing-Line Floats, of which the following is a specification, reference being had to the accompanying drawings.

My invention relates to improvements in fishing-line floats, and the object thereof is to provide means by which the same is securely held to the line and so arranged that it may be conveniently adjusted thereon. I accomplish this by devices illustrated in the accompanying drawings, in which—

Figure 1 is a sectional view without the line and with the binding-cap in a position just above the stem; Fig. 2, a front view of the same with the binding-cap in position; Fig. 3, a sectional view of the stem and cap, showing the line clamped therein; Fig. 4, an exterior view of the stem; Fig. 5, a sectional view of the stem with the cap removed, and showing the position of the line when it is passed through the side openings in the stem; and Fig. 6, a cross-section of the float.

Similar letters refer to similar parts throughout the several views.

The letter A designates the body of the float, which may be of any desired form, and through which I arrange a hollow stem, $b$, which projects from either end of the float, thereby affording a central opening, through which the line passes.

The stem $b$ may be constructed of any suitable material, though preferably of bamboo, and it is arranged at the upper end to clamp the line $c$ by having a slot, $d$, cut through or from both sides of the stem, thereby forming two fingers, $e$, that are pressed together by the binding-cap $f$, which firmly clamps the line and securely holds it at that place. Just below and at right angles to the slot $d$ are arranged two holes, $i$, in the stem diametrically opposite each other, through one of which may be passed the line in case an accident should happen to the fingers $e$, the other hole facilitating the placing of the line when arranged in this manner. The cap $f$ is then placed on the stem $b$, thus clamping the line between the cap and the stem. (See Fig. 5.)

The cap $f$ is arranged with an opening, $g$, through which the line passes, and is provided with a projecting neck, $h$, which has its diameter slightly smaller at its inside upper end than that of its inside outer end, thereby forming a taper hole, which, when it is placed on the stem $b$ and pushed down, presses the fingers $e$ together, which in turn clamp the line and securely hold the float to the desired place thereon.

In arranging the float on the line the latter is passed through the stem by any suitable means and then through the central opening, $g$, in the cap $f$. The float is then adjusted to the desired place and the cap placed and pressed down on the stem $b$, which draws the fingers $e$ together, (the flexibility of the bamboo permitting the same,) thus clamping the line.

In case it is desired to shift the float, the cap $f$ is not altogether removed from the stem, but slightly drawn back, which permits the line to be drawn either way. This affords a convenient arrangement by which the float is adjusted, securely held to the line, and which is not liable to get out of order.

Having fully described my invention, what I claim, and wish to secure by United States Letters Patent, is—

1. In a fishing-line float, the float A, the central hollow stem, $b$, rigidly secured to the float A, and provided with the slots $d$, whereby the clamping-fingers $e$ are formed thereon, in combination with the clamping-cap $f$, by which the line may be clamped to the stem by pressing the cap $f$ thereon.

2. In a fishing-line float, the body A, the hollow stem $b$, provided with the slots $d$, and the openings $i$, in combination with the cap $f$, as herein set forth.

In testimony whereof I affix my signature in presence of two witnesses.

HENRY C. BEHRENS.

Witnesses:
JNO. T. MADDOX,
G. A. BOYDEN.